(12) United States Patent
Kato (10) Patent No.: US 6,933,961 B2
(45) Date of Patent: Aug. 23, 2005

(54) OPTICAL SCANNING SYSTEM (75) Inventor: Ryota Kato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/251,847

(22) Filed: Sep. 23, 2002

(65) Prior Publication Data
US 2003/0058330 A1 Mar. 27, 2003

(30) Foreign Application Priority Data
Sep. 27, 2001 (JP) ........................................ 2001-295733

(51) Int. Cl.$^7$ .............................................. B41J 27/00
(52) U.S. Cl. ...................................... 347/258; 347/244
(58) Field of Search ................................. 347/241–244, 347/256–258, 259; 359/205, 206, 668, 720

(56) References Cited

U.S. PATENT DOCUMENTS 5,025,268 A * 6/1991 Arimoto et al. ............ 347/259
5,671,079 A * 9/1997 Nagasaka et al. ........... 359/205
5,701,190 A * 12/1997 Mochizuki et al. ......... 359/205
6,097,421 A * 8/2000 Takeshita et al. ........... 347/258
6,104,521 A * 8/2000 Iizuka ....................... 359/205

* cited by examiner

Primary Examiner—Hai Pham
(74) Attorney, Agent, or Firm—Oliff & Berridge, PLC (57) ABSTRACT A multi-beam scanning optical system includes a light source, a collimating lens, a cylindrical lens, a polygon mirror, and an fθ lens system. The fθ lens system is made up of a first fθ lens whose entrance surface and exit surface have rotational symmetries, and a second fθ lens whose entrance surface has a rotational symmetry and exit surface has a rotational asymmetry. In the first fθ lens, the entrance surface is a spherical surface, and the exit surface thereof is an aspherical surface. The entrance surface of the second fθ lens is an aspherical surface, and the exit surface thereof is a toroidal surface with aspheric contour in a cross section taken along the main scanning direction. The second fθ lens is physically shaped so as to satisfy the inequity $0.9<(Le \times \cos\theta)/Lc<1.1$.

19 Claims, 10 Drawing Sheets

SUB-SCANNING DIRECTION

MAIN SCANNING DIRECTION

MAIN SCANNING DIRECTION

SUB-SCANNING DIRECTION

FIG. 8

MAIN SCANNING DIRECTION

SUB-SCANNING DIRECTION

FIG. 9

MAIN SCANNING DIRECTION

SUB-SCANNING DIRECTION

FIG. 10

OPTICAL SCANNING SYSTEM

BACKGROUND OF THE INVENTION

1. Field of Invention

The invention relates to an optical scanning system for use with an image forming apparatus.

2. Description of Related Art

Conventionally, in an optical scanning system used in an image forming apparatus, such as a laser printer, image recording is performed by emitting a collimated beam of light from a light source, focusing the beam on a reflective surface of a deflector through a cylindrical lens placed in front of the deflector in a sub-scanning direction, and focusing the deflected beam on a surface to be scanned using an fθ optical system that scans with constant velocity thereon.

In a conventional fθ optical system, focal points in the main scanning direction and the sub-scanning direction are likely to vary back and forth in accordance with a scanning position. Therefore, in designing an fθ lens, attention has been directed toward reducing curvature of field to within an acceptable limit. When a laser beam with an inclination in the sub-scanning direction enters such an fθ lens, a deviation in the sub-scanning direction from an ideal scanning line varies according to a scanning position. This is caused because a focal length in the sub-scanning direction and the primary plane vary according to a scanning direction. As a result, magnification in the sub-scanning direction varies.

In addition, such a conventional fθ optical system needs a great power in a main scanning direction in order to launch a collimated beam in the main scanning direction, thereby the lens is likely to become large and thick. In particular, the manufacture of thick lenses in a plastic injection molding machine requires a long molding time, leading to cost increases. In addition, such a thick lens has a great difference in thickness between a center and an edge thereof, which makes molding difficult and stable performance can not be obtained.

To solve these problems, fθ scanning lenses which launch a convergent beam in the main scanning direction have been developed recently. However, because of complicated surface structure using a free curved surface, advanced technology is required for manufacturing such lenses, leading to cost increases.

For high printing speed and fine resolution, a multi-beam scanning optical system, which scans a plurality of lines at one time, using a plurality of semiconductor lasers or a semiconductor laser with a plurality of luminous points, has been developed. In the multi-beam scanning optical system, when magnification in the sub-scanning direction is different between a center, a start, and an end of a scanning line, a scanning line pitch varies in accordance with the magnification. If the scanning line pitch varies, the quality of image scanned degrades.

SUMMARY OF THE INVENTION

The invention provides an optical scanning system that can use a thin and small lens that is free of a complicated free curved surface, and restricts a variance of magnification in the sub-scanning direction.

The optical scanning system may include a first optical system that converges a light beam emitted from a light source at least in a main scanning direction; a second optical system that focuses the light beam converged by the first optical system on a deflection surface of a deflector in a sub-scanning direction; and a third optical system that spottily focuses the light beam deflected by the deflector on a surface to be scanned and causes the light beam to scan the surface to be scanned with a constant velocity. The third optical system includes a first lens of which an entrance surface and an exit surface have rotational symmetries, and a second lens of which the entrance surface has a rotational symmetry and the exit surface has a rotational asymmetry. The optical scanning system satisfies the inequity $0.9 < (Le \times \cos \theta)/Lc < 1.1$ where Lc is a distance from the exit surface of the second lens to the surface to be scanned in a center of a scanning line, Le is a distance from the exit surface of the second lens to the surface to be scanned at a start and an end of the scanning line, and θ is an angle formed by a laser beam at an end of the scanning line and a perpendicular line of the surface to be scanned.

When the optical scanning system as described above is used, in particular, as a multi-beam scanning optical system in an image forming apparatus, a variance of magnification in the sub-scanning direction influences the quality of image as variance of a scanning line pitch. However, the variance of a value determined by multiplying the distance from the exit surface of the second lens containing the maximum power in the sub-scanning direction to the surface to be scanned by the incident angle is substantially equal to the variance of magnification in the sub-scanning direction. By satisfying the above inequality, the variance of the scanning line pitch can be reduced to within ±10%, and high image quality can be achieved. Further, this structure can greatly reduce power in the main scanning direction, required for a scanning lens, compared with a conventional fθ optical system, and thus, can make the lens thin. The first lens is made up of a rotational symmetry surface only, which contributes to facilitated manufacture of molding and inspection testing and reduced costs. In the second lens as well, the entrance surface has a rotational symmetry and the exit surface only contains power that is differentiated between the main and sub-scanning directions. Thus, the optical scanning system can be structured as simple as an optical system where a conventional fθ lens is used.

BRIEF DESCRIPTION OF THE DRAWINGS

The invention will be described in greater detail with reference to preferred embodiments thereof and the accompanying drawings wherein.

DETAILED DESCRIPTION OF PREFERRED EMBODIMENTS

Figure 1:
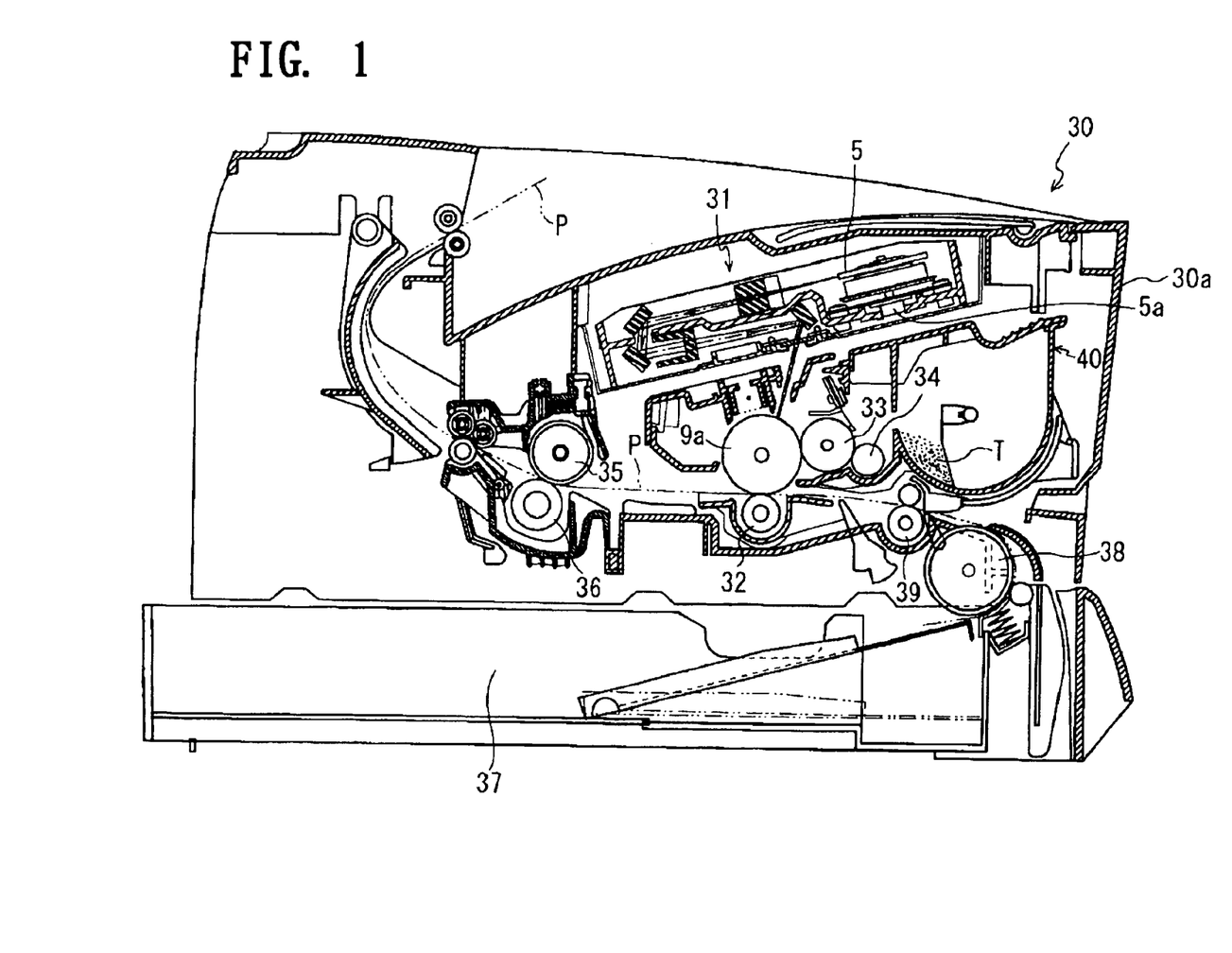
FIG. 1 is a cross sectional view of a laser printer incorporating a laser scanner unit according to an embodiment of the invention.
Figure 2:
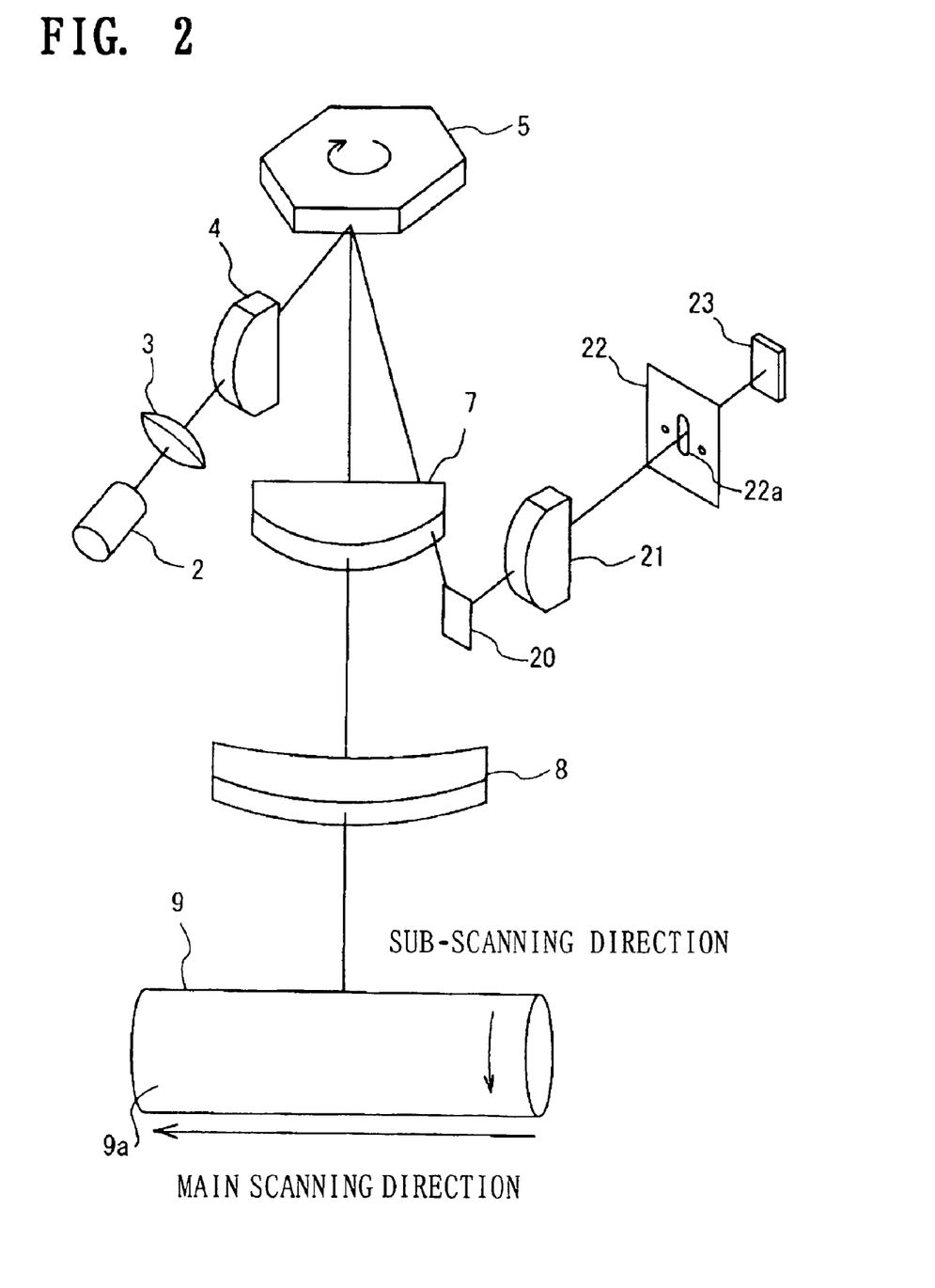
FIG. 2 is a schematic view of an optical system inside the laser scanner unit.

A preferred embodiment of the invention will be described in detail with reference to the accompanying drawings. FIG. 1 is a cross sectional view of a laser printer 30 incorporating a laser scanner unit 31 according to an embodiment of an optical scanning system of the invention. FIG. 2 is a schematic view of an optical system inside the laser scanner unit 31.

A structure of the laser printer 30 will be described with reference to FIG. 1. As shown in FIG. 1, the laser printer 30 includes the laser scanner unit 31 and a photosensitive unit 40 in substantially a cuboid casing 30a. A sheet cartridge 37 is detachably provided at a lower portion of the laser printer 30. Sheets of paper P are stacked in the sheet cartridge 37, each of the sheets is conveyed to a lower part of the photosensitive unit 40 by a sheet feed roller 38 and a conveyor roller 39. Toner T is contained in the photosensitive unit 40, and supplied to a developing roller 33 by a toner supply roller 34. From the developing roller 33, the toner T is supplied to a cylindrical-shaped photosensitive drum 9a where an electrostatic latent image is formed, and development is made. A transfer roller 32 is disposed under the photosensitive drum 9a. A toner image formed on the photosensitive drum 9a is transferred onto a sheet P by the transfer roller 32, and the toner on the sheet P is melted and fixed onto the sheet P due to heat applied while the sheet is passed between a fixing roller 35 and a pressure roller 36.

The laser scanner unit 31, that irradiates the photosensitive drum 9a with laser beams according to image signals, is disposed above the photosensitive unit 40. A multi-beam scanning optical system 1 is incorporated into the laser scanner unit 31. Inside the laser scanner unit 31, a polygon mirror 5 and a motor 5a, that rotates the polygon mirror 5, are also provided.

A brief overview of an optical system in the laser scanner unit 31 will be described with reference to FIG. 2. As shown in FIG. 2, a collimating lens 3 and a cylindrical lens 4 are provided between a light source 2 and the polygon mirror 5. The light source 2 is made up of a plurality of semiconductor lasers or a semiconductor laser with a plurality of luminous points. The collimating lens 3 converges laser beams emitted from the light source 2 toward the main and sub-scanning directions. The cylindrical lens 4 focuses the laser beams, converged by the collimating lens 3, on the polygon mirror 5 in the sub-scanning direction. A first fθ lens 7 and a second fθ lens 8 are provided in front of the polygon mirror 5, so that the laser beams scan on a surface of the photosensitive drum 9a, which is a surface to be scanned 9, in the main scanning direction with substantially a constant velocity.

A mirror 20 is provided near the right end portion of the first fθ lens 7 (FIG. 2). A laser beam reflected on the mirror 20 is directed to an origin detection sensor 23 through a condenser lens 21 and a slit 22a in a shield 22. When the origin detection sensor 23 detects a laser beam, the laser beam emitted from the light source 2 is modulated according to an image signal.

Figure 3:
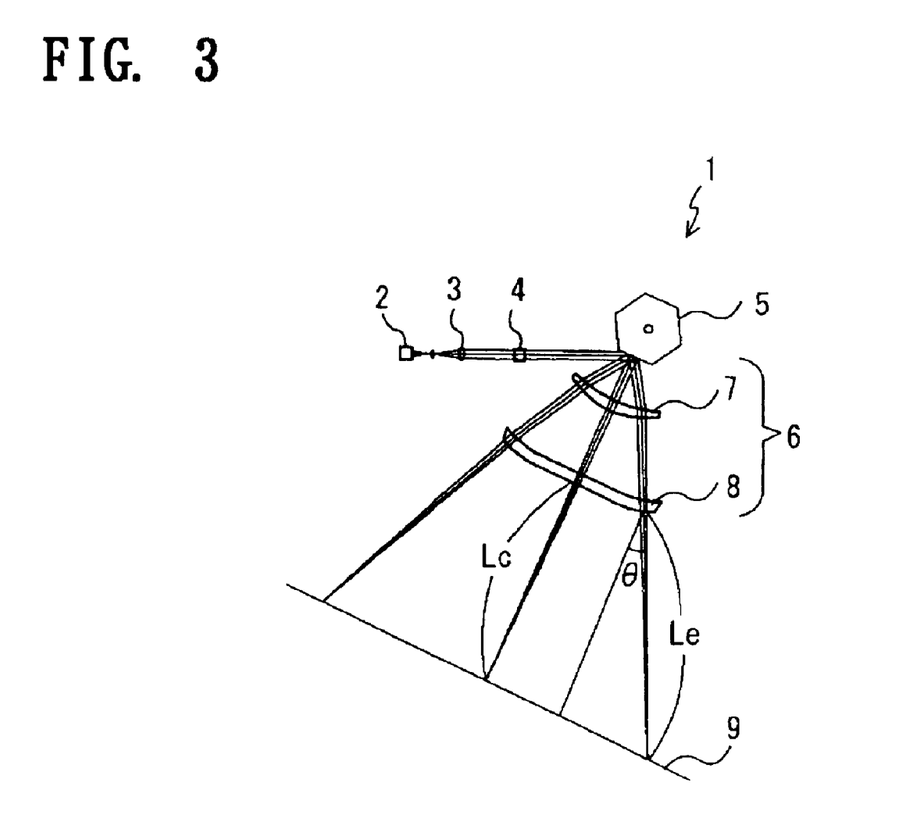
FIG. 3 is a plan view of a multi-beam scanning optical system.

The multi-beam scanning optical system 1 of the embodiment applied to the laser scanner unit 31 will be described with reference to FIG. 3. FIG. 3 is a plan view of the multi-beam scanning optical system 1. The multi-beam scanning optical system 1 is applied to an optical scanning device in an image forming apparatus, such as a laser printer and a digital copier. As shown in FIG. 3, the multi-beam scanning optical system 1 is made up of the light source 2, the collimating lens 3, which is a first optical system, the cylindrical lens 4, which is a second optical system, the polygon mirror 5, which is a deflector, and an fθ lens system 6, which is a third optical system. As a deflector, a galvano mirror can be used in addition to the polygon mirror 5.

The collimating lens 3 transforms laser beams emitted from the light source 2 into convergent beams in the main and sub-scanning directions. The cylindrical lens 4 has refractive power only in the sub-scanning direction, and focuses the laser beams passing through the collimating lens 3 on the polygon mirror 5. The polygon mirror 5 is rotated at a fixed speed by the motor 5a.

The fθ lens system 6 includes two fθ lenses (a first fθ lens 7 and a second fθ lens 8), and focuses the laser beams deflected and reflected by the polygon mirror 5 on the surface to be scanned 9. The surface to be scanned 9 is a surface of the photosensitive drum 9a, which has an optical axis extending in the main scanning direction. The semiconductor lasers or luminous points are arranged in the optical scanning device to form beam spots on the surface to be scanned 9 along the sub-scanning direction. Upon the rotation of the polygon mirror 5, the beam spots are simultaneously shifted on the surface to be scanned 9 for scanning. When the polygon mirror 5 is rotated at a constant velocity, a time required to complete scanning entirely on the surface to be scanned is shorter compared with a case where only a single beam spot is shifted for scanning. That is, light exposure to the image for scanning can be completed in a short time, and when the laser scanner unit 31 is embodied in a printing apparatus, the printing speed will be increased.

The first fθ lens 7 includes an entrance surface and an exit surface which both have rotational symmetries. In the second fθ lens 8, an entrance surface has a rotational symmetry and an exit surface has a rotational asymmetry. In the embodiment, the entrance surface of the first fθ lens 7 is a spherical surface, and the exit surface thereof is an aspherical surface. The entrance surface of the second if lens 8 is an aspherical surface, and the exit surface thereof is a toroidal surface with aspheric contour in a cross section taken along the main scanning direction. The toroidal surface has refractive power that is differentiated between the main and sub-scanning directions. An axis parallel to the main scanning direction is an x-axis, an axis parallel to the sub-scanning direction is a y-axis, and an axis parallel to a direction of travel of light is a z-axis. An aspherical surface expressed by an equation of high degree is as follows:

$$z = \frac{(1/r)\rho^2}{1+\sqrt{1-(1+k)(1/r)^2\rho^2}} + A\rho^4 + B\rho^6 + C\rho^8 + D\rho^{10} \text{ [mm]}$$

where $\rho$ is a distance extending from a point of the z-axis on a line on a curved surface normal to the z-axis, r is a curvature radius at the pole of the surface, k is a conic coefficient, and A, B, C, and D are aspherical surface coefficients.

In the embodiment, the shape of the exit surface of the second fθ lens 8 in the main scanning direction is determined from the following: r=451.78167, k=0, A=0.166161E-05, B=0.390228E-09, C=−0.121654E-12, D=0.854589E-17.

The second fθ lens 8 features its physical shape satisfying the following inequality [1]:

$$0.9 < (Le \times \cos\theta)/Lc < 1.1$$

where Lc is a distance from the exit surface of the second fθ lens 8 to the surface to be scanned 9 in the center of a scanning line, Le is a distance from the exit surface of the second fθ lens 8 to the surface to be scanned 9 at a start and an end of the scanning line, and θ is an angle formed by a laser beam at an end of the scanning line and a perpendicular line to the surface to be scanned 9.

In a multi-beam laser scanner that performs scanning with a plurality of laser beams, the variance of magnification in the sub-scanning direction influences the quality of image as variance of a scanning line pitch. In this multi-beam scanning optical system 1, a surface containing the maximum power in the sub-scanning direction is the exit surface of the second fθ lens 8. Thus, the variance of a value determined by multiplying the distance from the second fθ lens 8 to the surface to be scanned 9 by the incident angle is substantially equal to the variance of magnification in the sub-scanning direction. The variance of the scanning line pitch is preferably reduced within ±10% considering the influence to the quality of image. By satisfying the above conditions, a high quality multi-beam laser scanner can be achieved.

In this embodiment, the distance from the exit surface of the second fθ lens to the surface to be scanned 9 is 123 mm at the center of the scanning line. It is 139.35 mm at the start and the end of the scanning line (position: −105 mm). The incident angle θ to the surface to be scanned 9 is 24.65 degrees. Therefore, (Le×cos θ)/Lc=(139.35×cos 24.65°)/123=1.00346 satisfies the above inequality [1].

When the multi-beam scanning optical system 1 structured in such a manner is used, divergent beams emitted from the light source 2 are altered into convergent beams through the collimating lens 3, and then enter the cylindrical lens 4. The convergent beams incident on the cylindrical lens 4 travel as they remain unchanged in a cross section taken along the main scanning direction, converge in a cross section taken along the sub-scanning direction, and gather on a deflection surface of the polygon mirror 5. The beams deflected and reflected on the deflection surface of the polygon mirror 5 are focused to form beam spots on the surface to be scanned 9 via the fθ lens system 6. When the polygon mirror 5 is rotated with a constant velocity, laser beams as beam spots are scanned on the surface to be scanned 9 in the main scanning direction. In this manner, image recording is performed on the surface to be scanned 9.

Figure 4:
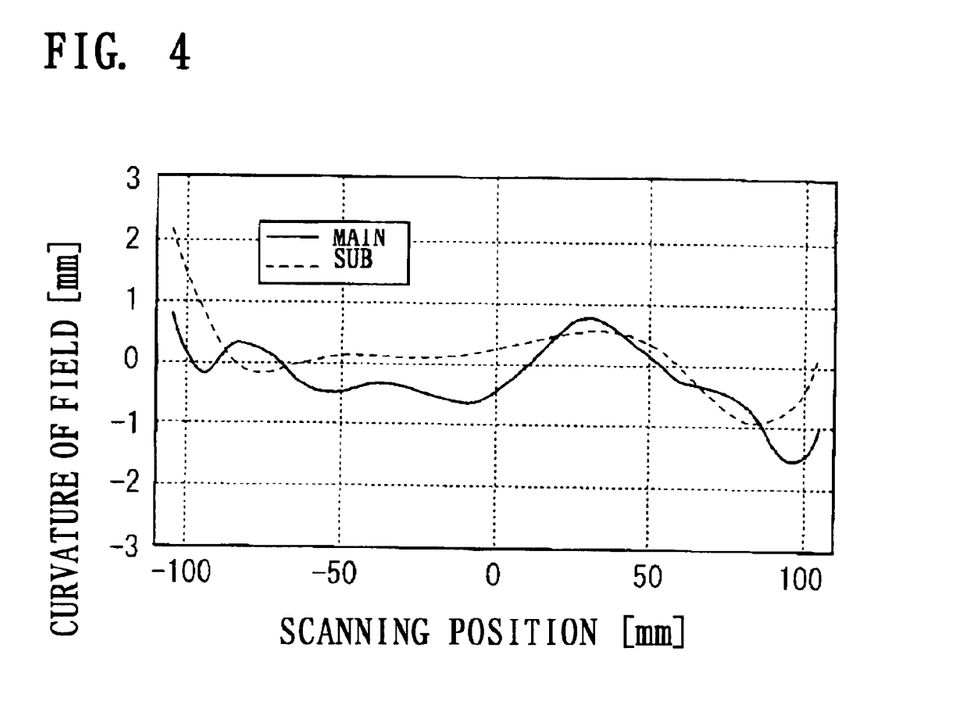
FIG. 4 is a graph showing a curvature of an imaging surface of a second fθ lens.
Figure 5:
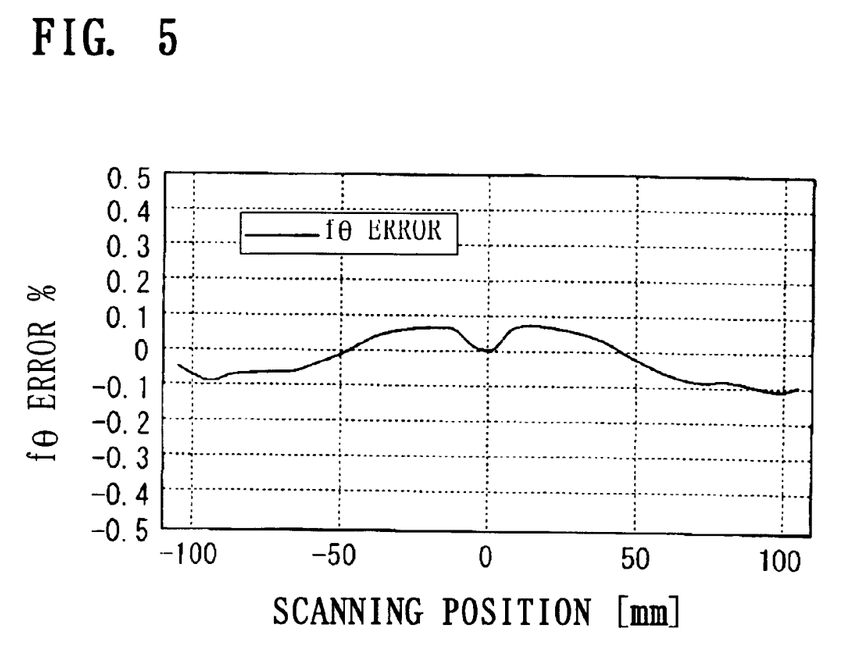
FIG. 5 is a graph showing an fθ error of the second fθ lens.
Figure 6:
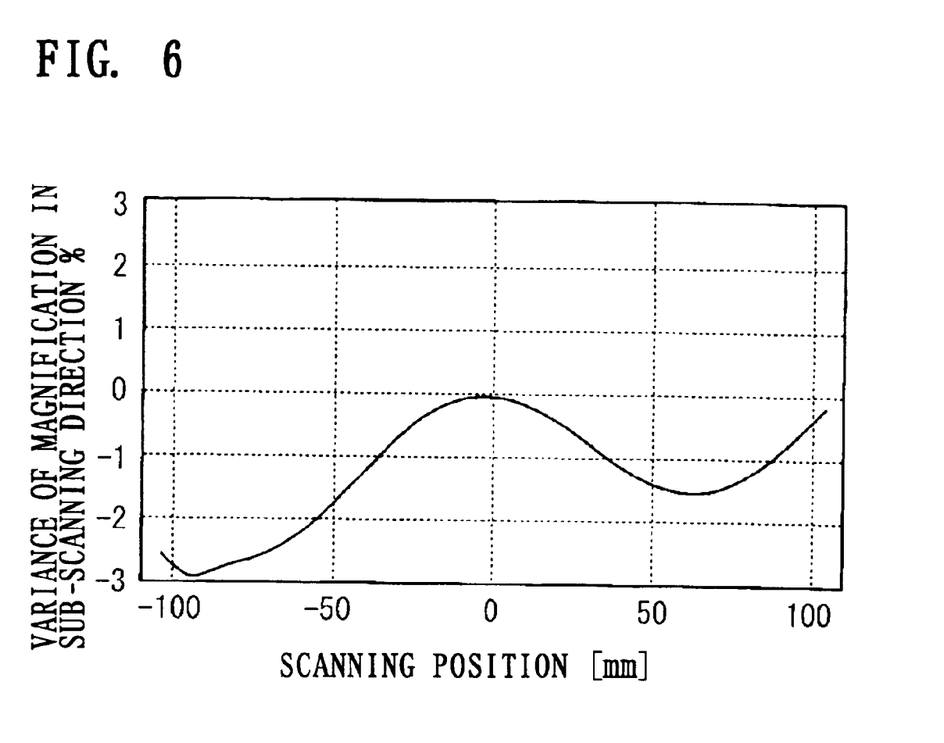
FIG. 6 is a graph showing a variance of magnification in the sub-scanning direction when the multi-beam scanning optical system is used.

FIG. 4 shows a curvature of field of the second fθ lens 8. As shown in FIG. 4, the curvature of field showing deviations of the focus of a lens is kept within 2 mm, and it is apparent that the second fθ lens 8 has an applicable performance as a scanning lens. FIG. 5 shows an fθ error of the second fθ lens 8. The fθ error represents variations in the linear speed. If the fθ error falls within ±0.5%, a lens is generally considered to be applicable as a scanning lens. In this embodiment, the fθ error is restricted within 0.1%, and therefore, the second fθ lens 8 has adequate performance for a scanning lens. Further, FIG. 6 shows a variance of magnification in the sub-scanning direction when the multi-beam scanning optical system 1 of the embodiment is used. As shown in FIG. 6, the variance from peak to peak is restricted within 3%, so that the scanning line pitch is small enough to form a high quality image.

With this structure, the power in the main scanning direction necessary for a scanning lens can be greatly reduced in the fθ lens system 6 of the embodiment compared with that in a conventional fθ optical system that passes the collimated light thereinto. As a result, it is possible to make a lens that is thin and small. Thin and small lenses can be produced with minimized fluctuations in thickness and in a short molding time, which contributes to reduced costs and improves the accuracy of shaping. The first fθ lens 7 is made up of a rotational symmetry surface only, which contributes to facilitated manufacture in molding and inspection testing and reduced costs. In the second fθ lens 8 as well, the entrance surface has a rotational symmetry and the exit surface only contains power that is differentiated between the main and sub-scanning directions. Thus, the fθ optical system 6 of the multi-beam scanning optical system 1 can be structured as simple as an optical system where a conventional fθ lens is used.

Figure 7:
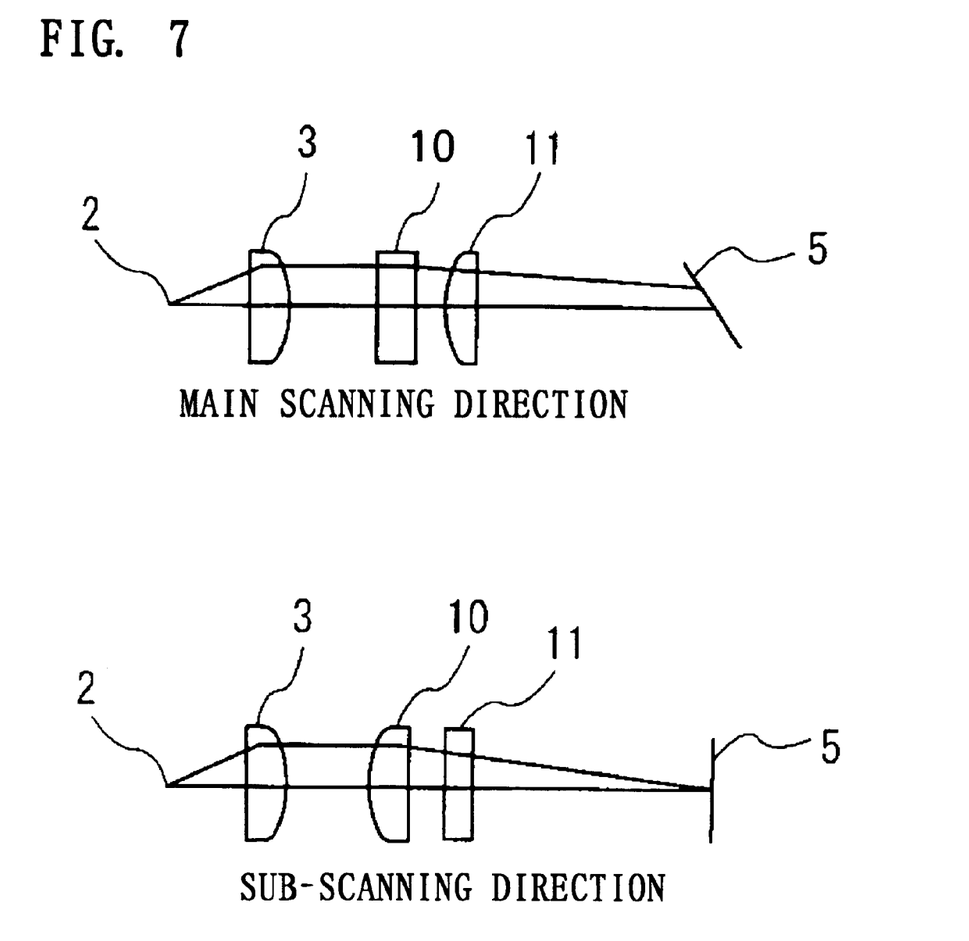
FIG. 7 is a cross sectional view of a modification of the multi-beam scanning optical system.

FIG. 7 shows a structure modified from that of the multi-beam scanning optical system 1, and schematically illustrates parts from the collimating lens 3 to the polygon mirror 5. In this modification, the second optical system is made up of two lenses, a first cylindrical lens 10, which has power only in the main scanning direction, and a second cylindrical lens 11, which has power only in the sub-scanning direction. With this structure, the two lenses can be differentiated in property, which can reduce the effects due to environmental variance, such as fluctuations of the refractive rate due to expansion or shrinkage of lenses with a change in temperature or humidity. For example, when a temperature coefficient of the refractive rate of both lenses 10, 11 is changed, a ratio that the focal point is missed due to the fluctuations of temperature can be reduced. In particular, when the cylindrical lenses 10, 11 are plastic lenses, they can reduce the effects due to environmental variance because a plastic material has high environmental dependence.

Figure 8:
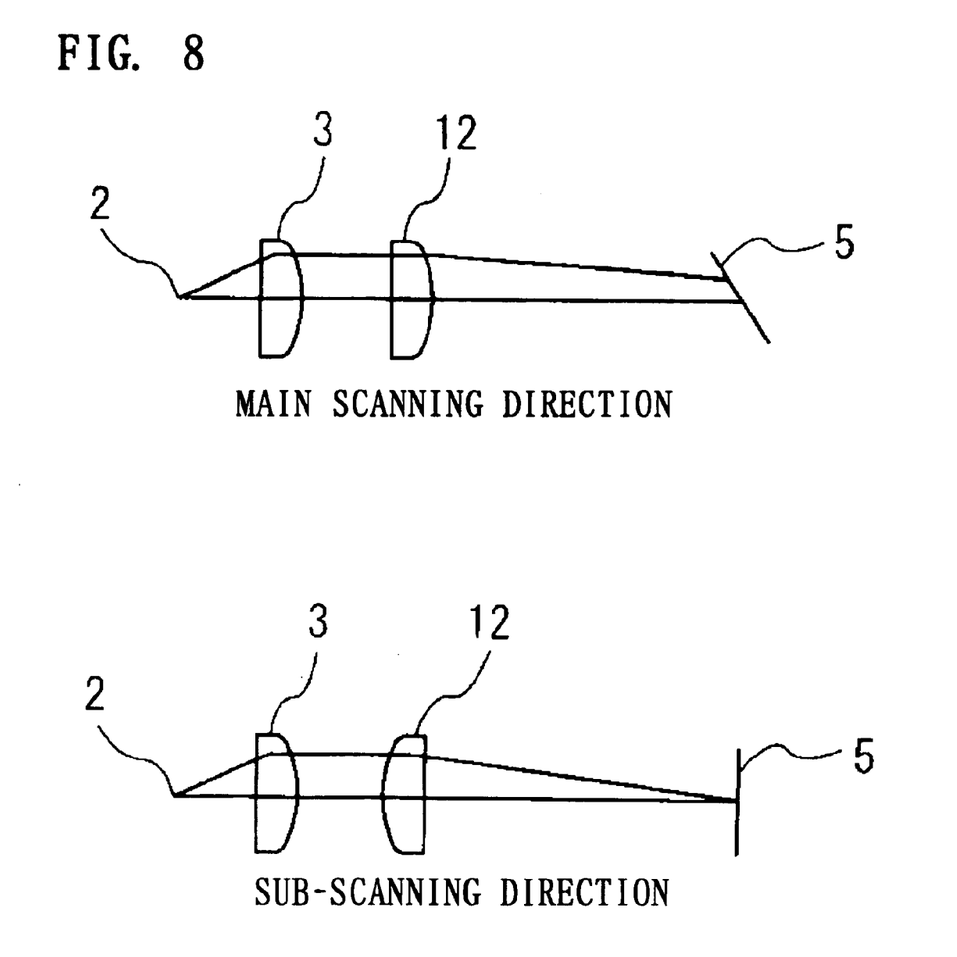
FIG. 8 is a cross sectional view of another modification of the multi-beam scanning optical system.

FIG. 8 shows another structure modified from that of the multi-beam scanning optical system 1. As with FIG. 7, it schematically illustrates parts from the collimating lens 3 to the polygon mirror 5. In this modification, the second optical system is made up of one cylindrical lens 12, whose entrance surface has power in the sub-scanning direction and exit surface has power in the main scanning direction. As the second optical system is made up of one lens, the number of parts can be decreased, flexibility of parts arrangement can be improved, and costs can be reduced.

Figure 9:
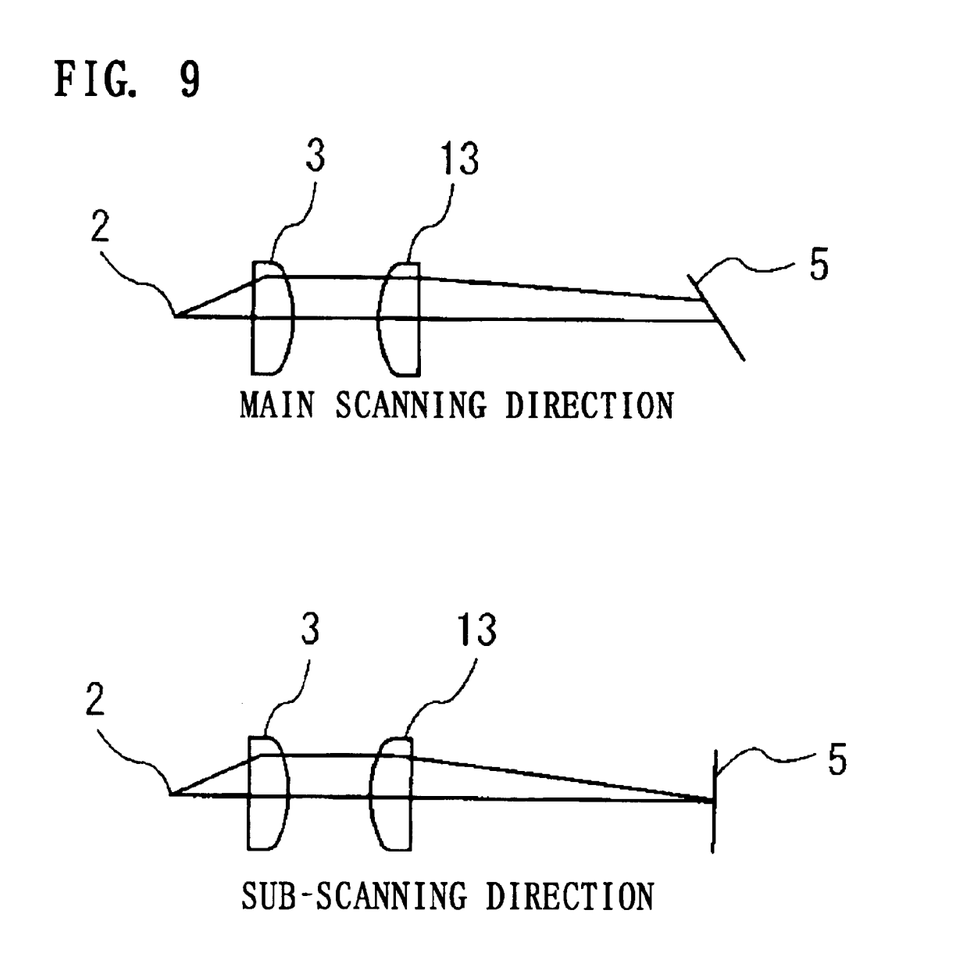
FIG. 9 is a cross sectional view of a further modification of the multi-beam scanning optical system.

FIG. 9 shows a structure further modified from that of the multi-beam scanning optical system 1. As with FIGS. 7 and 8, it schematically illustrates parts from the collimating lens 3 to the polygon mirror 5. In this modification, the second optical system is made up of one cylindrical lens 13, whose entrance surface only has power in both the main and sub-scanning directions. The power in both directions may be applied to the exit surface. As the second optical system is made up of one lens, the number of parts can be decreased, flexibility of parts arrangement can be improved, and costs can be reduced.

Figure 10:
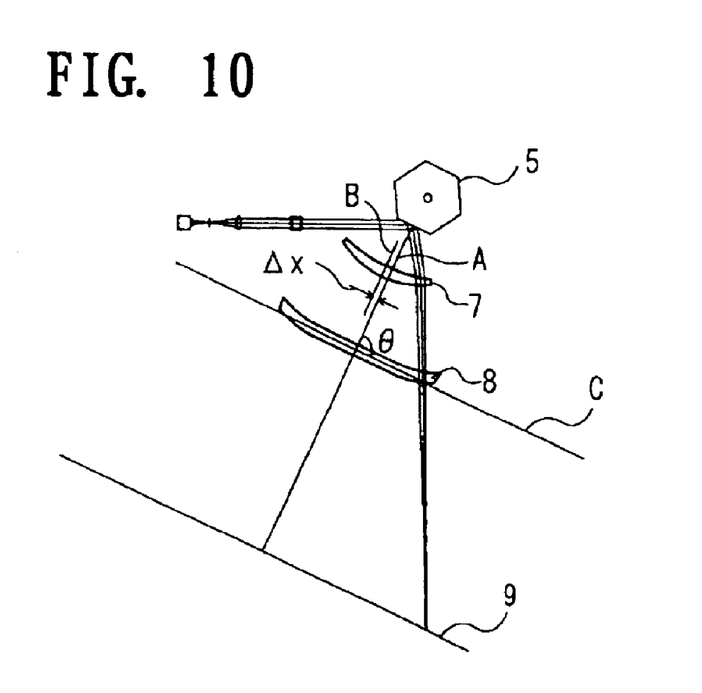
FIG. 10 is a plan view of a modification of a third optical system wherein a positional relationship between an optical axis of the third optical system and lenses is changed.

FIG. 10 shows another structure modified from the third optical system of the multi-beam scanning optical system 1. As shown in FIG. 10, the first fθ lens 7 is arranged such that an optical axis B of the first fθ lens 7 is eccentrically parallel (offset but parallel) to an optical axis A of the modified optical system for Δx on a side that the beams project on the polygon mirror 5, in a cross section taken along the main scanning direction. The optical axis A of the modified multi-beam scanning optical system is a center of the beam when a beam reflected on the polygon mirror 5 projects perpendicularly onto the surface to be scanned 9.

A focal point is displaced back and forth because, while the polygon mirror 5 is rotated, an optical length from a position where the laser beam is reflected on the polygon mirror 5 to the surface to be scanned 9 varies asymmetrically with respect to the center of a scanning line and the scanning direction, so that an asymmetrical curvature of field is generated. However, in this modified multi-beam scanning optical system, displacement of a focal point caused by the variation of the optical length can be corrected with the eccentricity of lenses. More specifically, when a lateral symmetrical scanning lens is used in the scanning optical system, displacement of a focal point can be corrected by shifting the lens parallel with respect to the cross section taken along the main scanning direction and the sub-scanning direction.

In addition, displacement of a focal point caused by the variation of the optical length can be corrected by changing inclinations of the first fθ lens 7 and the second fθ lens 8 independently. Specifically, as shown in FIG. 10, the second fθ lens 8 is placed with an inclination different from that of the first fθ lens 7 in a cross section taken along the main scanning direction. Angle θ is an angle formed by the optical axis A of the scanning optical system and the normal C to the optical axis of the second fθ lens 8 in the scanning direction. When angle θ is 90 degrees, there is no inclination. An inclination is given to the second fθ lens 8 by θ=90 degrees+Δθ, so that curvature of field caused by the asymmetrical variation of the optical length can be corrected. Additionally, the first fθ lens 7 can be placed with an inclination different from that of the second fθ lens 8 in a cross section taken along the main scanning direction. Further, the first fθ lens 7 and the second fθ lens 8 can be placed independently with different inclinations.

In a multi-beam laser scanner with a plurality of light sources, the variation of magnification in the sub-scanning direction leads to the variance of the scanning line pitch, resulting in a reduction in image quality. However, according to the invention, the variance of the magnification in the sub-scanning direction can be reduced thereby keeping a high image quality. The invention is not limited to a multi-beam laser scanner. In a single beam laser scanner with a single light source also, displacement of a focal point on the surface to be scanned can be corrected, thereby providing high image quality.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An optical scanning system, comprising:
 a first optical system that converges a light beam emitted from a light source at least in a main scanning direction;
 a second optical system that focuses the light beam converged by the first optical system on a deflection surface of a deflector in a sub-scanning direction; and
 a third optical system that spottily focuses the light beam deflected by the deflector on a surface to be scanned and causes the light beani to scan the surface to be scanned with a constant velocity, wherein the third optical system comprises a first lens of which an entrance surface and an exit surface have rotational symmetries, and a second lens of which an entrance surface has a rotational symmetry and an exit surface has a rotational asymmetry, and wherein the optical scanning system satisfies an inequality 0.9<(Le×cos θ)/Lc <1.1, where Lc is a distance from the exit surface of the second lens to the surface to be scanned in a center of a scanning line, Le is a distance from the exit surface of the second lens to the surface to be scanned at a start and an end of the scanning line, and θ is an angle formed by a laser beam at an end of the scanning line and a perpendicular line of the surface to be scanned.

2. The optical scanning system according to claim 1, wherein an axis of the first lens and an axis of the second lens deviate from each other in a cross section taken along the main scanning direction.

3. The optical scanning system according to claim 2, wherein the axis of the first lens and the axis of the second lens deviate from each other but are parallel to each other in the cross section taken along the main scanning direction.

4. The optical scanning system according to claim 2, wherein the axis of the first lens and the axis of the second lens deviate from each other independently in the cross section taken along the main scanning direction.

5. The optical scanning system according to claim 1, wherein the first optical system alters the light beam emitted from the light source into a substantially collimated beam, and the second optical system converges the collimated beam in the main scanning direction.

6. The optical scanning system according to claim 5, wherein the second optical system comprises a first lens having power in the main scanning direction only and a second lens having power in the sub-scanning direction only.

7. The optical scanning system according to claim 6, wherein the first lens and the second lens have different temperature coefficients of refractive power.

8. The optical scanning system according to claim 5, wherein the second optical system comprises one lens of which an entrance surface has power in the sub-scanning direction only and an exit surface has power in the main scanning direction only.

9. The optical system according to claim 5, wherein the second optical system comprises one lens of which an entrance surface has power in the main scanning direction and the sub-scanning direction.

10. The optical system according to claim 5, wherein the second optical system comprises one lens of which an exit surface has power in the main scanning direction and the sub-scanning direction.

11. An optical scanning system for a printing device using a light beam deflected from a deflector, comprising:
 a first optical system for converging the light beam emitted from a light source;
 a second optical system having a refracting power in at least one of two orthogonal directions, the at least one direction along a deflection surface of the deflector in a sub-scanning direction;
 a third optical system comprising a first lens and a second lens, the third optical system spottily focuses the light beam deflected by the deflector on a surface to be scanned and causes the light beam to scan the surface to be scanned with a constant velocity by the first lens and the second lens, the first lens, closest to the deflector, having an entrance surface and an exit surface with rotational symmetries, and the second lens having an entrance surface with rotational symmetry and an exit surface with rotational asymmetry, wherein the entrance surface of the first lens is spherical and the exit surface is aspherical, the entrance surface of the second lens is aspherical and the exit surface is toroidal with aspheric contour in cross section along a main scanning direction that is orthogonal to the sub-scanning direction and the optical scanning system satisfies an inequality $0.9<(Le\times\cos\theta)/Lc<1.1$, where Lc is a distance from the exit surface of the second lens to the surface to be scanned in a center of a scanning line, Le is a distance from the exit surface of the second lens to the surface to be scanned at a start and an end of the scanning line, and $\theta$ is an angle formed by a laser beam outgoing from the second lens at an end of the scanning line and a perpendicular line of the surface to be scanned.

12. The optical scanning system, according to claim 11, wherein an axis of the first lens and an axis of the second lens deviate from each other in a cross section taken along the main scanning direction.

13. The optical scanning system according to claim 12, wherein the axis of the first lens and the axis of the second lens deviate from each other but are parallel to each other in the cross section taken along the main scanning direction.

14. The optical scanning system according to claim 11, wherein the first optical system alters the light beam emitted from the light source into a substantially collimated beam, and the second optical system converges the collimated beam in the sub-scanning direction.

15. The optical scanning system according to claim 14, wherein the second optical system comprises a first lens having power in the main scanning direction only and a second lens having power in the sub-scanning direction only.

16. The optical scanning system according to claim 15, wherein the first lens and the second lens have different temperature coefficients of refractive power.

17. The optical scanning system according to claim 14, wherein the second optical system comprises one lens of which an entrance surface has power in the sub-scanning direction only and an exit surface has power in the main scanning direction only.

18. The optical system according to claim 14, wherein the second optical system comprises one lens of which an entrance surface has power in the main scanning direction and the sub-scanning direction.

19. The optical system according to claim 14, wherein the second optical system comprises one lens of which an exit surface has power in the main scanning direction and the sub-scanning direction.

* * * * *